(12) United States Patent
Ebert et al.

(10) Patent No.: US 10,915,162 B2
(45) Date of Patent: Feb. 9, 2021

(54) FLEXURE BASED GUIDANCE SYSTEM FOR VARIFOCAL HEAD-MOUNTED DISPLAYS

(71) Applicant: Facebook Technologies, LLC, Menlo Park, CA (US)

(72) Inventors: Ryan Michael Ebert, Kirkland, WA (US); David C. Lindberg, Portland, OR (US); Seth Robert Moczydlowski, Austin, TX (US); Clinton Smith, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 188 days.

(21) Appl. No.: 16/149,303

(22) Filed: Oct. 2, 2018

(65) Prior Publication Data

US 2019/0384378 A1    Dec. 19, 2019

Related U.S. Application Data

(60) Provisional application No. 62/685,396, filed on Jun. 15, 2018.

(51) Int. Cl.
*G06F 3/01* (2006.01)
(52) U.S. Cl.
CPC .................................. *G06F 3/011* (2013.01)
(58) Field of Classification Search
CPC combination set(s) only.
See application file for complete search history.

(56) References Cited

U.S. PATENT DOCUMENTS

| 8,605,008 B1 | 10/2013 | Prest et al. |
| 2003/0035349 A1 | 2/2003 | Widdowson et al. |
| 2012/0127062 A1 | 5/2012 | Bar-Zeev et al. |
| 2017/0148215 A1 | 5/2017 | Aksoy et al. |
| 2017/0358136 A1 | 12/2017 | Gollier et al. |

FOREIGN PATENT DOCUMENTS

JP    2007/060530 A    3/2007

OTHER PUBLICATIONS

PCT International Search Report and Written Opinion, PCT Application No. PCT/US2018/055524, dated Mar. 22, 2019, 12 pages.

(Continued)

*Primary Examiner* — William Boddie
*Assistant Examiner* — Alecia D. English
(74) *Attorney, Agent, or Firm* — Fenwick & West LLP (57) ABSTRACT

A varifocal head mounted display (HMD) includes an electronic display, an optical system, and the guidance system. The electronic display presents content. The optical system includes one or more optical elements and provides the content to an eyebox of the HMD. The guidance system is a flexure based guidance system that includes an actuator and a first and second flexure elements (e.g., parallel beam, dual Roberts, etc.) guiding movement of the electronic display along an optical axis of the optical system in order to adjust a location of one or moveable elements in the optical system and, thereby, control a location of an image plane. The first and second flexure elements are able to flex or bend with movement of the actuator to adjust the location of the one or moveable elements that includes the electronic display and/or one or more optical elements of the optical system.

13 Claims, 6 Drawing Sheets

(56) References Cited

OTHER PUBLICATIONS

Tajbakhsh, H. et al., "Three-Degre-of-Freedom Optic Mount for Extreme Ultraviolet Lithography," American Society for Precision Engineering, 13$^{th}$ Annual Meeting, Oct. 30, 1998 https://e-reports-ext.llnl.gov/pdf/235106.pdf.
European Patent Office, Extended European Search Report and Opinion, European Patent Application No. 19153692.9, dated Aug. 7, 2019, 9 pages.
Kendall, J.B. et al., "Double Arm Linkage Precision Linear Motion (DALL) Carriage, a simplified, rugged, high performance linear motion stage for the moving mirror of an Fourier Transform Spectrometer or other system requiring precision linear motion," Optomectianical Engineering, 2017, vol. 10371, International Society for Optics and Photonics.

FLEXURE BASED GUIDANCE SYSTEM FOR VARIFOCAL HEAD-MOUNTED DISPLAYS

CROSS-REFERENCE TO RELATED APPLICATIONS

This application claims the benefit of U.S. Application No. 62/685,396, filed Jun. 15, 2018, which is incorporated by reference in its entirety.

BACKGROUND

This disclosure relates generally to guidance systems, and in particular to flexure based guidance systems for varifocal head-mounted displays.

A head mounted display (HMD) can be used to provide virtual images to a user. For example, stereoscopic images are displayed on an electronic display inside the HMD to simulate the illusion of depth and head tracking sensors estimate what portion of the virtual environment is being viewed by the user. Conventional HMDs are often unable to compensate for vergence and accommodation conflicts when rendering content, which may cause visual fatigue and nausea in users.

SUMMARY

A varifocal head mounted display (HMD) includes an electronic display, an optical system (e.g., a pancake lens assembly), and the guidance system. The electronic display presents content. The optical system includes one or more optical elements and provides the content to an eyebox of the HMD. The guidance system is a flexure based guidance system that includes an actuator and a system of one or more flexure elements guiding movement of the electronic display along an optical axis of the optical system in order to adjust a location of one or more moveable elements in the optical system and, thereby, control a location of an image plane. The system of one or more flexure elements are able to flex or bend with movement of the actuator to adjust the location of the one or more moveable elements that includes the electronic display and/or one or more optical elements of the optical system.

The guidance system, in one embodiment, is a parallel beam flexure guidance system that includes an actuator (e.g., a voice coil actuator, stepper motor, brushless DC motor, etc.), a first pair of flexure beams configured to guide movement of the electronic display 102 along an optical axis of optical system and to prevent tip/tilt in a first dimension (i.e., x-axis), and a second pair of flexure beams configured to guide movement of the electronic display 102 along an optical axis of optical system and to prevent tip/tilt in a second dimension (i.e., y-axis). In this embodiment, the actuator is positioned off-axis relative to the optical axis and the first and second pair of flexure beams are arched in shape to conform to a shape around the optical system to minimize the form factor of the HMD. At one end, the actuator is fixed relative to the electronic display in order to move electronic display and, at the other end, the actuator is fixed relative to the optical system. Accordingly, the first and second pairs of flexure beams extend from the actuator while curving around the optical system to locations that are fixed relative to the optical system. Thus, when actuator is operated, the end of the actuator fixed relative to the electronic display is extended to move the electronic display relative to the optical system and, thereby, adjusting the location of the image plane while the first and second pairs of flexure beams are flexed or bent away from the optical system.

In another embodiment, the guidance system is a Roberts flexure guidance system that includes an actuator, three flexure elements, a pivot point where each of these flexure elements are connected in a triangular array, a first anchor for the central flexure element of this triangular array that is fixed relative to the optical system, and a pair of second anchors that each connect to one of the outer flexures of the triangular array that are fixed relative to the electronic display and the moving end of the actuator. Thus, when actuator is operated, the end of the actuator fixed relative to the electronic display is extended to move the electronic display relative to the optical system to adjust the location of the image plane while the flexure elements are flexed about the pivot point. This causes the pair of second anchors to move in the z-direction relative to the first anchor, thereby, producing linear motion along the optical axis in a predictable and repeatable manner.

Accordingly, these flexure guidance systems produce linear motion along an optical axis of the optical system while minimizing parasitic error motions including straightness of travel of electronic display relative to the optical axis while minimizing angular error. Moreover, these flexure guidance systems produce this motion within a relatively small form factor while minimizing power requirements.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Flexure Guidance System Overview

A varifocal system provides dynamic adjustment of the focal distance of a head mounted display (HMD) or other near-eye optic systems to keep a user's eyes in a zone of comfort as vergence and accommodation change. The system uses an eye tracker to determine a vergence depth corresponding to where the user is looking and adjusts the focus to ensure image is in focus at the determined focal plane. The system, in one implementation, physically changes the distance between an electronic display and one or more lenses of an optical block of the HMD by moving the electronic display, one or more lenses of the optical block, or a combination of both using various actuation devices.

The movement of these elements is guided by a flexure guidance system. A flexure guidance system makes use of compliant flexure elements that deform/deflect deterministically when mechanically stressed. A flexure guidance system is friction-free when compared to shaft in bushing guidance, can potentially be implemented with fewer parts, and may be integrated to molded plastic parts.

There are three main objectives in designing a flexure guidance system for a varifocal HMD. The first is to strive to produce pure linear motion along the desired axis of travel while minimizing parasitic error motions. This includes straightness of travel relative to the desired motion axis as well as angular error; both of which can weaken the user experience. The desired axis of travel is along the optical axis of the optics of the HMD. The second objective is to produce this motion within a form factor that is not cumbersome to user. The third object is to minimize power requirements since the motor must also overcome the deformation of the flexures that guide motion. All objectives are deeply coupled and designing for just one or two can result in unsatisfactory performance in the others.

To approach pure linear motion while minimizing motor requirements, in some embodiments, off-axis stiffness is maximized while the on-axis stiffness in the direction of motion is minimized. Off-axis stiffness of a leaf flexure is highly sensitive to the length L, and width b, of the flexures (inversely proportional to $L^3$ and proportional to $b^3$) and the spacing between them. On-axis stiffness is highly sensitive to the thickness t, and length of the flexures (proportional to $t^3$ and inversely proportional to $L^3$). By reducing the thickness of individual flexures and increasing the quantity of flexures (from 2 to quantity n) to produce an array of flexures, the structural sensitivities are exploited to significantly reduce on-axis stiffness (on-axis stiffness is proportional to number of flexures, n) with lesser effects on off-axis stiffness.

The significant reduction in on-axis stiffness while maintaining most off-axis stiffness opens the solution space for flexure geometry/form factor as well as material selection (e.g. stainless steel vs titanium).

System Overview

Figure 1:
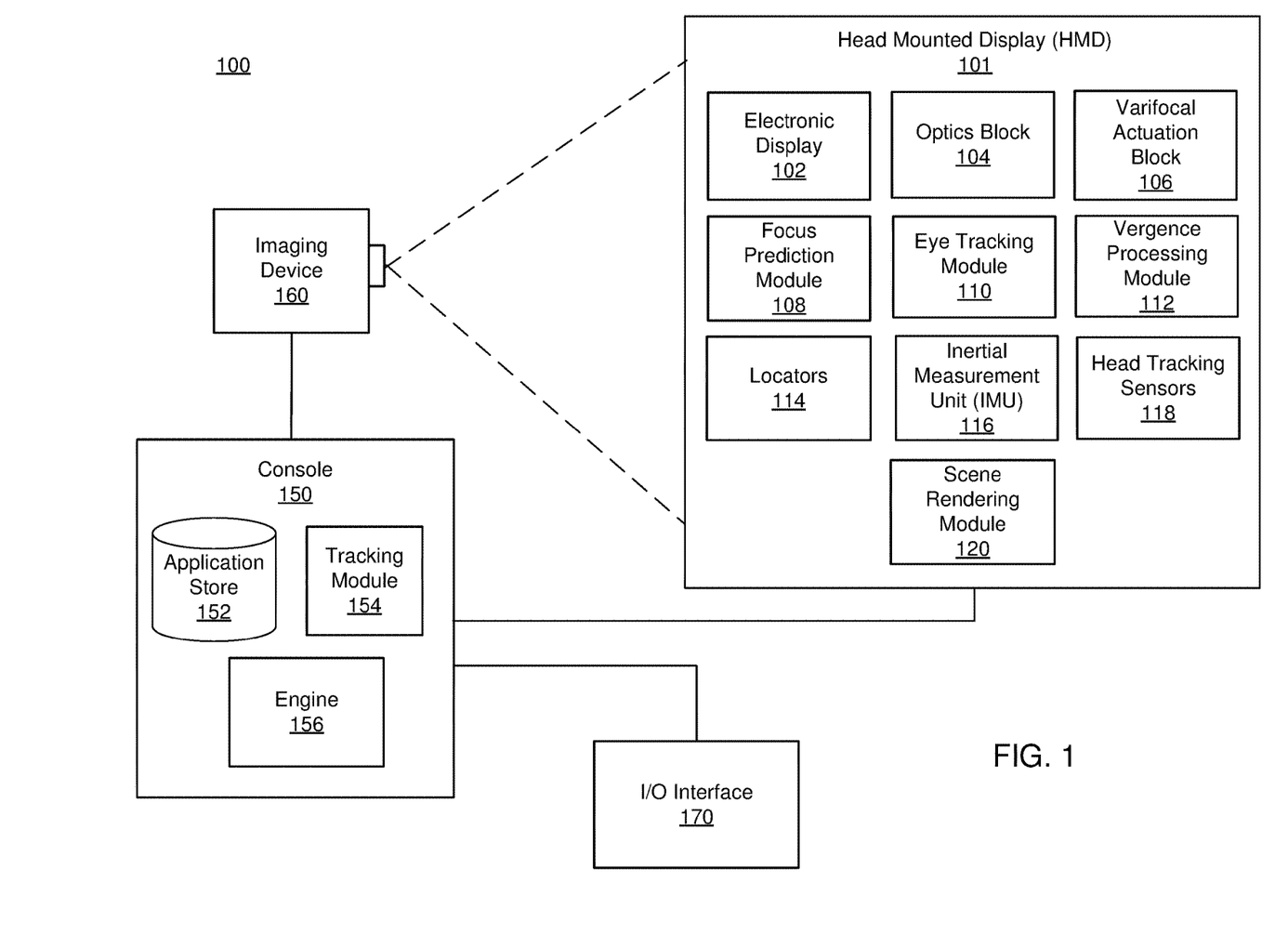
FIG. 1 shows an example virtual reality system, in accordance with at least one embodiment.

FIG. 1 shows varifocal system 100 in which a head-mounted display (HMD) 101 operates. Varifocal system 100 may be for use as a virtual reality (VR) system, an augmented reality (AR) system, a mixed reality (MR) system, or some combination thereof. In this example, the varifocal system 100 includes HMD 101, imaging device 160, and I/O interface 170, which are each coupled to console 150. While FIG. 1 shows a single HMD 101, a single imaging device 160, and a single I/O interface 170, in other embodiments, any number of these components may be included in the system. For example, there may be multiple HMDs each having an associated I/O interface 170 and being monitored by one or more imaging devices 160, with each HMD 101, I/O interface 170, and imaging devices 160 communicating with the console 150. In alternative configurations, different and/or additional components may also be included in the system environment.

HMD 101 presents content to a user. Example content includes images, video, audio, or some combination thereof. Audio content may be presented via a separate device (e.g., speakers and/or headphones) external to HMD 101 that receives audio information from HMD 101, console 150, or both. HMD 101 includes electronic display 102, optics block 104, varifocal actuation block 106, focus prediction module 108, eye tracking module 110, vergence processing module 112, one or more locators 114, inertial measurement unit (IMU) 116, head tracking sensors 118, and scene rendering module 120.

Optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view. The optics block 104 can be a single lens or a system of lenses, such as a pancake lens. Additional detail regarding a pancake lens assembly is describe in detail in U.S. application Ser. Nos. 15/993,316, and 15/292,108, which are hereby incorporated by reference in their entirety.

Optics block 104 may be designed to correct one or more optical errors. Examples of optical errors include: barrel distortion, pincushion distortion, longitudinal chromatic aberration, transverse chromatic aberration, spherical aberration, chromatic aberration, field curvature, astigmatism, and so forth. In some embodiments, content provided to electronic display 102 for display is pre-distorted, and optics block 104 corrects the distortion when it receives image light from electronic display 102 generated based on the content.

Varifocal actuation block 106 includes a varifocal actuation block that causes optics block 104 to vary the focal distance of HMD 101 to keep a user's eyes in a zone of comfort as vergence and accommodation change. In one embodiment, varifocal actuation block 106 physically changes the distance between electronic display 102 and optical block 104 by moving electronic display 102 or optical block 104 (or both), as will be explained further with respect to FIGS. 4A-21B. Additionally, moving or translating two lenses relative to each other may also be used to change the focal distance of HMD 101. Thus, varifocal actuation block 106 may include actuators or motors that move electronic display 102 and/or optical block 104 to change the distance between them. Varifocal actuation block 106 may be separate from or integrated into optics block 104 in various embodiments.

Each state of optics block 104 corresponds to a focal distance of HMD 101 or to a combination of the focal distance and eye position relative to optics block 104 (as discussed further below). In operation, optics block 104 may move in a range of ~5-10 mm with a positional accuracy of ~5-10 μm for a granularity of around 1000 focal distances, corresponding to 1000 states of optics block 104. Any number of states could be provided; however, a limited number of states accommodate the sensitivity of the human eye, allowing some embodiments to include fewer focal distances. For example, a first state corresponds to a focal distance of a theoretical infinity meters (0 diopter), a second state corresponds to a focal distance of 2.0 meters (0.5 diopter), a third state corresponds to a focal distance of 1.0 meters (1 diopter), a fourth state corresponds to a focal distance of 0.5 meters (1 diopter), a fifth state corresponds to a focal distance of 0.333 meters (3 diopter), and a sixth state corresponds to a focal distance of 0.250 meters (4 diopter). Varifocal actuation block 106, thus, sets and changes the state of optics block 104 to achieve a desired focal distance.

Focus prediction module 108 is an encoder including logic that tracks the position or state of optics block 104 to predict to one or more future states or locations of optics block 104. For example, focus prediction module 108 accumulates historical information corresponding to previous states of optics block 104 and predicts a future state of optics block 104 based on the previous states. Because rendering of a virtual scene by HMD 101 is adjusted based on the state of optics block 104, the predicted state allows scene rendering module 120, further described below, to determine an adjustment to apply to the virtual scene for a particular frame. Accordingly, focus prediction module 108 communicates information describing a predicted state of optics block 104 for a frame to scene rendering module 120. Adjustments for the different states of optics block 104 performed by scene rendering module 120 are further described below.

Eye tracking module 110 tracks an eye position and eye movement of a user of HMD 101. A camera or other optical sensor inside HMD 101 captures image information of a user's eyes, and eye tracking module 110 uses the captured information to determine interpupillary distance, interocular distance, a three-dimensional (3D) position of each eye relative to HMD 101 (e.g., for distortion adjustment purposes), including a magnitude of torsion and rotation (i.e., roll, pitch, and yaw) and gaze directions for each eye. In one example, infrared light is emitted within HMD 101 and reflected from each eye. The reflected light is received or detected by the camera and analyzed to extract eye rotation from changes in the infrared light reflected by each eye. Many methods for tracking the eyes of a user can be used by eye tracking module 110. Accordingly, eye tracking module 110 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 110 integrates information from past measurements, measurements identifying a position of a user's head, and 3D information describing a scene presented by electronic display element 102. Thus, information for the position and orientation of the user's eyes is used to determine the gaze point in a virtual scene presented by HMD 101 where the user is looking.

Further, distance between a pupil and optics block 104 changes as the eye moves to look in different directions. The varying distance between pupil and optics block 104 as viewing direction changes is referred to as "pupil swim" and contributes to distortion perceived by the user as a result of light focusing in different locations as the distance between pupil and optics block 104. Accordingly, measuring distortion at different eye positions and pupil distances relative to optics block 104 and generating distortion corrections for different positions and distances allows mitigation of distortion caused by "pupil swim" by tracking the 3D position of a user's eyes and applying a distortion correction corresponding to the 3D position of each of the user's eye at a given point in time. Thus, knowing the 3D position of each of a user's eyes allows for the mitigation of distortion caused by changes in the distance between the pupil of the eye and optics block 104 by applying a distortion correction for each 3D eye position.

Vergence processing module 112 determines a vergence depth of a user's gaze based on the gaze point or an estimated intersection of the gaze lines determined by eye tracking module 110. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, vergence processing module 112 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, rather than provide accommodation for the eye at a determined vergence depth, accommodation may be directly determined by a wavefront sensor, such as a Shack-Hartmann wavefront sensor; hence, a state of optics block 104 may be a function of the vergence or accommodation depth and the 3D position of each eye, so optics block 104 brings objects in a scene presented by electronic display element 102 into focus for a user viewing the scene. Further, vergence and accommodation information may be combined to focus optics block 104 and to render synthetic depth of field blur.

Locators 114 are objects located in specific positions on HMD 101 relative to one another and relative to a specific reference point on HMD 101. Locator 114 may be a light emitting diode (LED), a corner cube reflector, a reflective marker, a type of light source that contrasts with an environment in which HMD 101 operates, or some combination thereof. Active locators 114 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 114 can be located beneath an outer surface of HMD 101, which is transparent to the wavelengths of light emitted or reflected by locators 114 or is thin enough not to substantially attenuate the wavelengths of light emitted or reflected by locators 114. Further, the outer surface or other portions of HMD 101 can be opaque in the visible band of wavelengths of light. Thus, locators 114 may emit light in the IR band while under an outer surface of HMD 101 that is transparent in the IR band but opaque in the visible band.

IMU 116 is an electronic device that generates fast calibration data based on measurement signals received from one or more of head tracking sensors 118, which generate one or more measurement signals in response to motion of HMD 101. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

Based on the measurement signals from head tracking sensors 118, IMU 116 generates fast calibration data indicating an estimated position of HMD 101 relative to an initial position of HMD 101. For example, head tracking sensors 118 include multiple accelerometers to measure translational motion (forward/back, up/down, left/right) and multiple gyroscopes to measure rotational motion (e.g., pitch, yaw, and roll). IMU 116 can, for example, rapidly sample the measurement signals and calculate the estimated position of HMD 101 from the sampled data. For example, IMU 116 integrates measurement signals received from the accelerometers over time to estimate a velocity vector and integrates the velocity vector over time to determine an estimated position of a reference point on HMD 101. The reference point is a point that may be used to describe the position of HMD 101. While the reference point may generally be defined as a point in space, in various embodiments, reference point is defined as a point within HMD 101 (e.g., a center of the IMU 130). Alternatively, IMU 116 provides the sampled measurement signals to console 150, which determines the fast calibration data.

IMU 116 can additionally receive one or more calibration parameters from console 150. As further discussed below, the one or more calibration parameters are used to maintain tracking of HMD 101. Based on a received calibration parameter, IMU 116 may adjust one or more IMU parameters (e.g., sample rate). In some embodiments, certain calibration parameters cause IMU 116 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 120 receives content for the virtual scene from engine 156 and provides the content for display on electronic display 102. Additionally, scene render module 120 can adjust the content based on information from focus prediction module 108, vergence processing module 112, IMU 116, and head tracking sensors 118. For example, upon receiving the content from engine 156, scene render module 120 adjusts the content based on the predicted state (i.e., eye position and focal distance) of optics block 104 received from focus prediction module 108 by adding a correction or pre-distortion into rendering of the virtual scene to compensate or correct for the distortion caused by the predicted state of optics block 104. Scene render module 120 may also add depth of field blur based on the user's gaze, vergence depth (or accommodation depth) received from vergence processing module 112, or measured properties of the user's eye (e.g., 3D position of the eye, etc.). Additionally, scene render module 120 determines a portion of the content to be displayed on electronic display 102 based on one or more of tracking module 154, head tracking sensors 118, or IMU 116, as described further below.

Imaging device 160 generates slow calibration data in accordance with calibration parameters received from console 150. Slow calibration data includes one or more images showing observed positions of locators 114 that are detectable by imaging device 160. Imaging device 160 may include one or more cameras, one or more video cameras, other devices capable of capturing images including one or more locators 114, or some combination thereof. Additionally, imaging device 160 may include one or more filters (e.g., for increasing signal to noise ratio). Imaging device 160 is configured to detect light emitted or reflected from locators 114 in a field of view of imaging device 160. In embodiments where locators 114 include passive elements (e.g., a retroreflector), imaging device 160 may include a light source that illuminates some or all of locators 114, which retro-reflect the light towards the light source in imaging device 160. Slow calibration data is communicated from imaging device 160 to console 150, and imaging device 160 receives one or more calibration parameters from console 150 to adjust one or more imaging parameters (e.g., focal distance, focus, frame rate, ISO, sensor temperature, shutter speed, aperture, etc.).

I/O interface 170 is a device that allows a user to send action requests to console 150. An action request is a request to perform a particular action. For example, an action request may be to start or end an application or to perform a particular action within the application. I/O interface 170 may include one or more input devices. Example input devices include a keyboard, a mouse, a game controller, or any other suitable device for receiving action requests and communicating the received action requests to console 150. An action request received by I/O interface 170 is communicated to console 150, which performs an action corresponding to the action request. In some embodiments, I/O interface 170 may provide haptic feedback to the user in accordance with instructions received from console 150. For example, haptic feedback is provided by the I/O interface 170 when an action request is received, or console 150 communicates instructions to I/O interface 170 causing I/O interface 170 to generate haptic feedback when console 150 performs an action.

Console 150 provides content to HMD 101 for presentation to the user in accordance with information received from imaging device 160, HMD 101, or I/O interface 170. In the example shown in FIG. 1, console 150 includes application store 152, tracking module 154, and engine 156. Some embodiments of console 150 have different or additional modules than those described in conjunction with FIG. 1. Similarly, the functions further described below may be distributed among components of console 150 in a different manner than is described here.

Application store 152 stores one or more applications for execution by console 150. An application is a group of instructions, that when executed by a processor, generates content for presentation to the user. Content generated by an application may be in response to inputs received from the user via movement of HMD 101 or interface device 170. Examples of applications include gaming applications, conferencing applications, video playback application, or other suitable applications.

Tracking module 154 calibrates system 100 using one or more calibration parameters and may adjust one or more calibration parameters to reduce error in determining position of HMD 101. For example, tracking module 154 adjusts the focus of imaging device 160 to obtain a more accurate position for observed locators 114 on HMD 101. Moreover, calibration performed by tracking module 154 also accounts for information received from IMU 116. Additionally, if tracking of HMD 101 is lost (e.g., imaging device 160 loses line of sight of at least a threshold number of locators 114), tracking module 154 re-calibrates some or all of the system components.

Additionally, tracking module 154 tracks the movement of HMD 101 using slow calibration information from imaging device 160 and determines positions of a reference point on HMD 101 using observed locators from the slow calibration information and a model of HMD 101. Tracking module 154 also determines positions of the reference point on HMD 101 using position information from the fast calibration information from IMU 116 on HMD 101. Additionally, tracking module 154 may use portions of the fast calibration information, the slow calibration information, or some combination thereof, to predict a future location of HMD 101, which is provided to engine 156.

Engine 156 executes applications within the system and receives position information, acceleration information, velocity information, predicted future positions, or some combination thereof for HMD 101 from tracking module 154. Based on the received information, engine 156 determines content to provide to HMD 101 for presentation to the user, such as a virtual scene. For example, if the received information indicates that the user has looked to the left, engine 156 generates content for HMD 101 that mirrors or tracks the user's movement in a virtual environment. Additionally, engine 156 performs an action within an application executing on console 150 in response to an action request received from the I/O interface 170 and provides feedback to the user that the action was performed. The provided feedback may be visual or audible feedback via HMD 101 or haptic feedback via I/O interface 170.

Flexure Guidance

A HMD, such as HMD 101, (or a near-eye display) uses a flexure based guidance system to dynamically adjust a location of an image plane (e.g., to address vergence-accommodation conflict). The guidance system is able to adjust a location of one or moveable elements (e.g., electronic display 102 and/or one or more optical elements) of optics block 104 to control a location of an image plane. As used herein, a moveable element is an element whose movement corresponds to a change in location of the image plane. For example, in the case of a pancake lens assembly, the guidance system may be configured to move one or all of the optical elements of the pancake lens and/or the electronic display 102 to change the location of the image plane.

The guidance system includes at least one actuator (e.g., a voice coil actuator, stepper motor, brushless DC electric motor, etc.) and a plurality of flexure elements that are able to flex and/or bend with movement of the actuator to adjust an on-axis location of at least one moveable element. The flexure elements can include, for example, a parallel beam flexure system (FIGS. 2-5B), a Roberts or dual Roberts (FIGS. 7-8B), diaphragm flexure, a straight line linkage based guidance with a flexure based pivoting element, a wire based flexure, a beam array, or some combination thereof.

Parallel Beam Flexure Guidance

Figure 2:
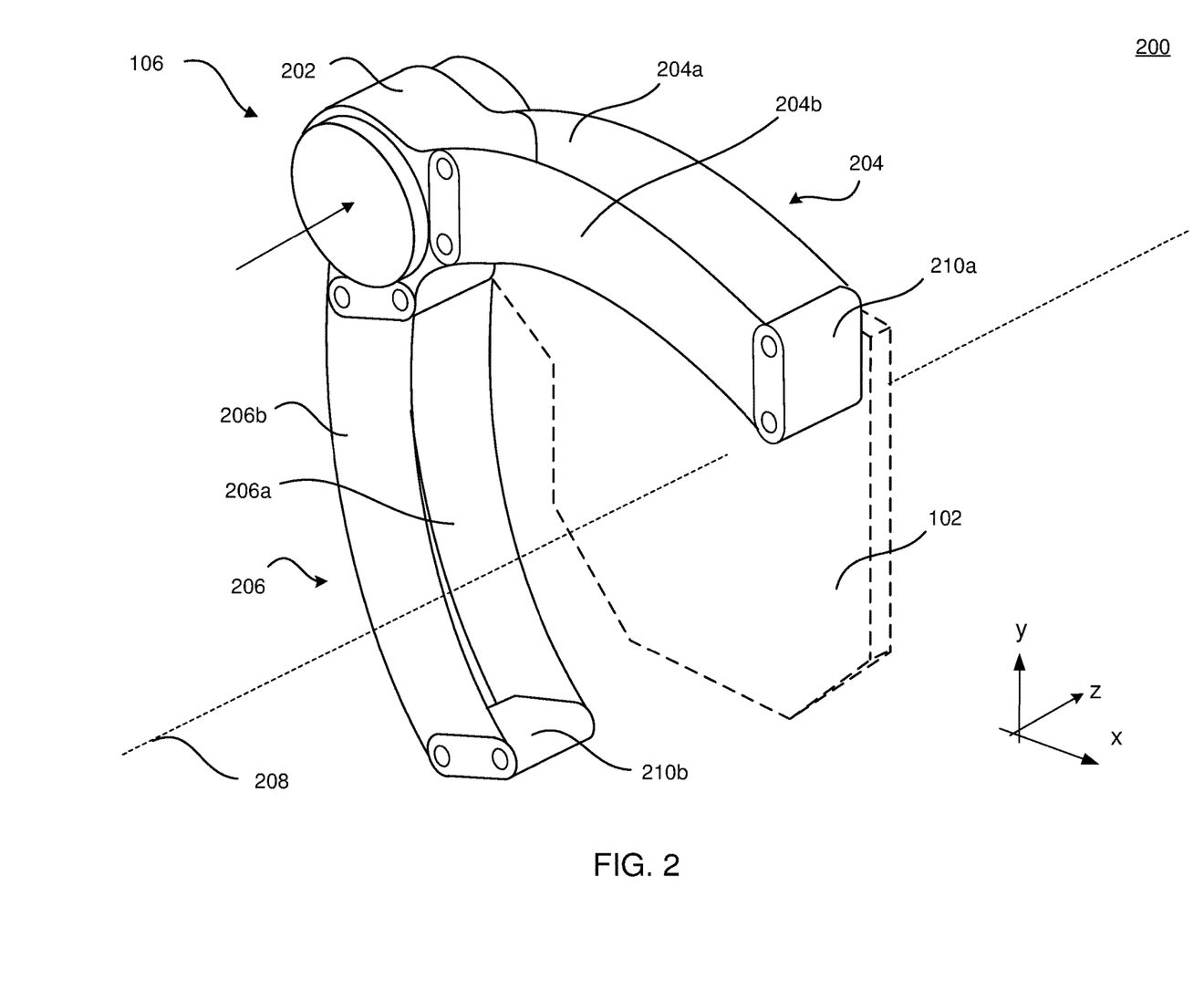
FIG. 2 shows a diagram of a parallel beam flexure guidance system for use within a head mounted display, in accordance with at least one embodiment.

FIG. 2 shows a diagram of a parallel beam flexure guidance system 200 for use within HMD 101, in accordance with at least one embodiment. Parallel beam flexure guidance system 200 includes an actuator 202 (e.g., a voice coil actuator, stepper motor, brushless DC motor, etc.), a first flexure element 204, and a second flexure element 206. The first flexure element 204 comprises a first flexure beam 204*a* and a second flexure beam 204*b* configured to guide movement of the electronic display 102 along an optical axis 208 of an optics block (not pictured) and prevent tip/tilt in a first dimension (i.e., x-axis) and the second flexure element 206 comprising a third flexure beam 206*a* and a fourth flexure beam 206*b* configured to guide movement of the electronic display 102 along the optical axis 208 (or z-axis) and prevent tip/tilt in a second dimension (i.e., y-axis). Where the first flexure element 204 and the second flexure element 206 guide movement of the electronic display 102 along the optical axis 208 while limiting and prevent tip/tilt and/or rotation of the electronic display 102 in the first dimension (e.g., tip/tilt about the x-axis) and the second dimension (e.g., tip/tilt about the y-axis). In this embodiment, the varifocal actuation block 106 includes a combination of actuator 202 and parallel beam flexure guidance system 200.

Figure 3:
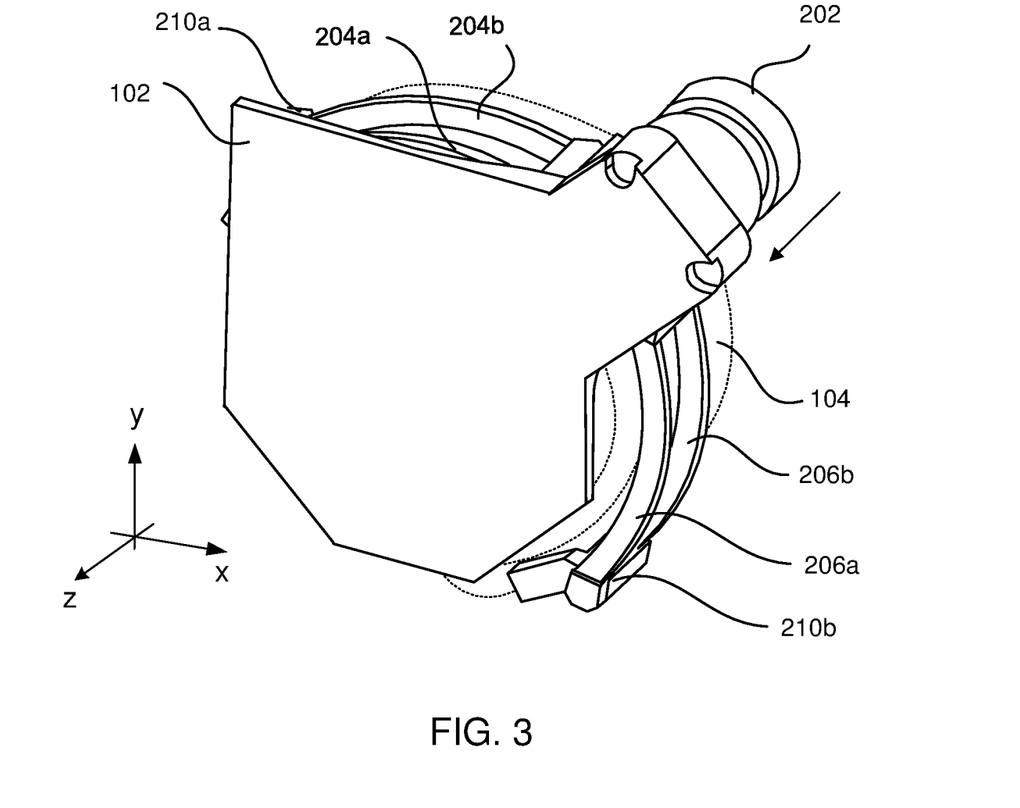
FIG. 3 shows another diagram of a parallel beam flexure guidance system that includes the optics block of the head mounted display, in accordance with at least one embodiment.
Figure 4:
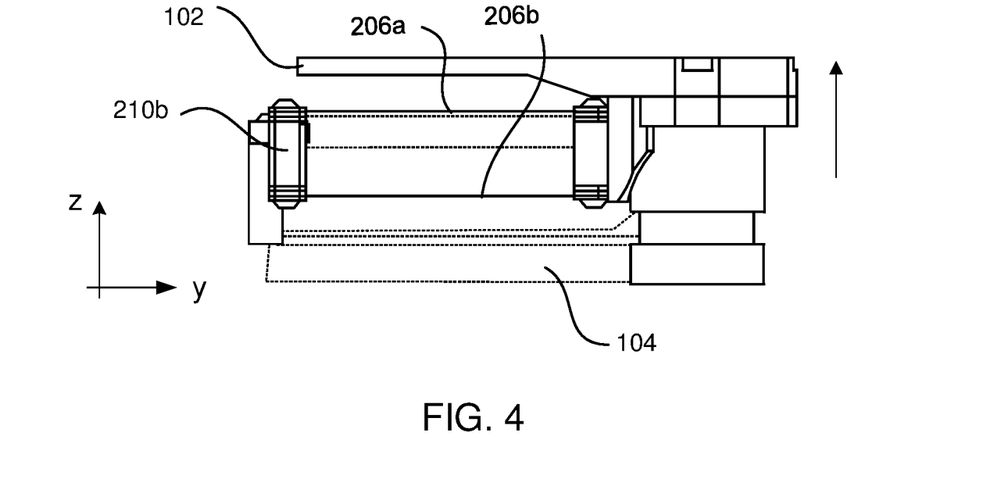
FIG. 4 shows a side view of diagram of the parallel beam flexure guidance system and optics block of FIG. 3.

FIGS. 3-4 show additional views of a parallel beam flexure guidance system 200, in accordance with various embodiments, that include optics block 104. As shown, actuator 202 is positioned off-axis relative to optics block 104, in one embodiment, and the first flexure element 204 and the second flexure element 206 are arched in shape to conform to a shape around the optics block 104 within the HMD 101 to minimize the form factor of the HMD 101. At one end, the actuator 202 is fixed relative to electronic display 102 in order to move electronic display 102. At the other end, actuator 202 is fixed relative to the optics block 104. Accordingly, the first flexure element 204 extends from the actuator 202 curved or arched horizontally to a location 210*a* that is fixed relative to the optics block 104. Similarly, the second flexure element 206 extends from the actuator 202 curved vertically to a location 210*b* that is also fixed relative to the optics block 104. Thus, when actuator 202 is operated, the end of the actuator 202 fixed relative to the electronic display 102 is extended to move the electronic display relative to the optics block 104 and, thereby, adjusting the location of the image plane. This movement is discussed in more detail below with respect to FIGS. 5A and 5B.

Figure 5A:
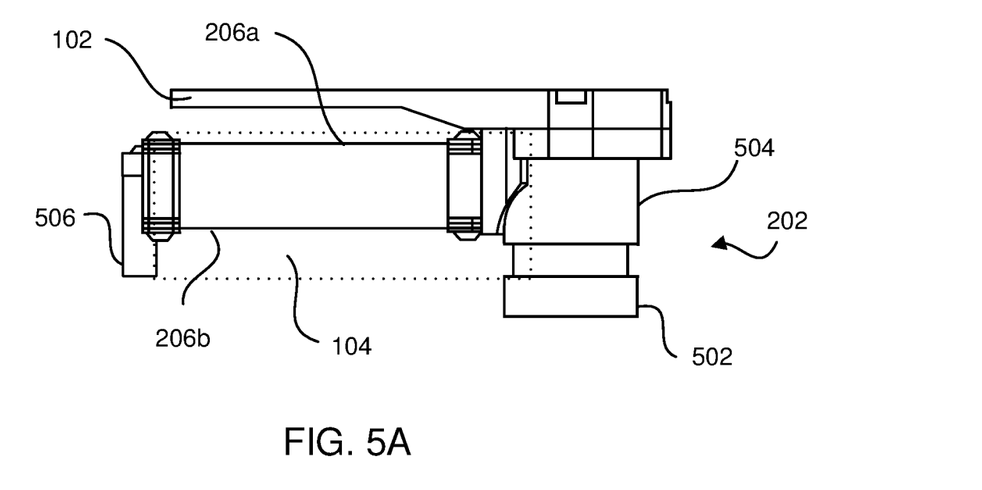
FIGS. 5A-5B show a parallel beam flexure guidance system of a head mounted display in operation, in accordance with various embodiments.
Figure 5B:
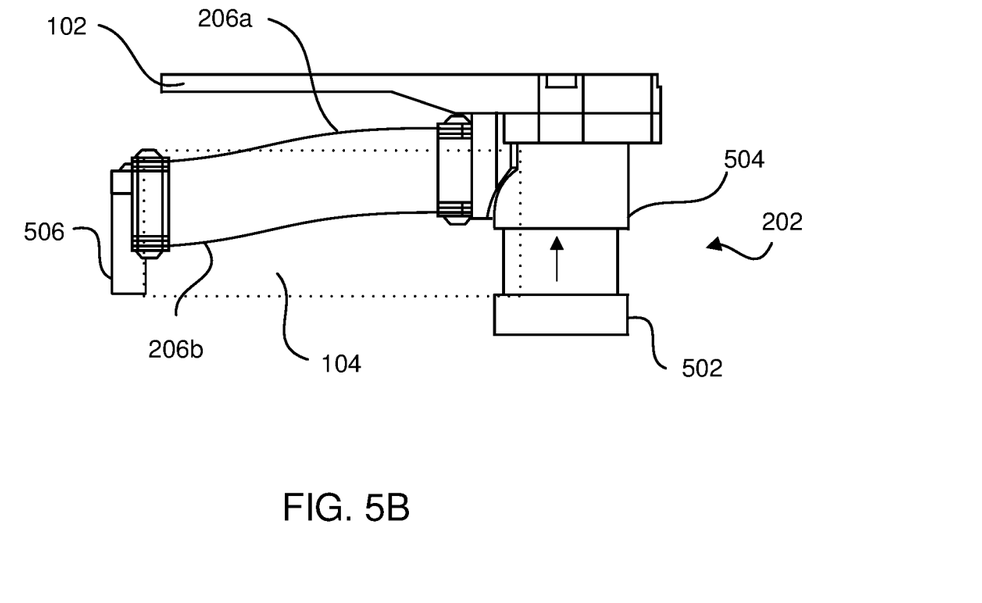

FIGS. 5A and 5B show a side view of the parallel beam flexure guidance system 200 of a HMD in operation, in accordance with various embodiments. FIG. 5A shows the parallel beam flexure guidance system 200 in a first state corresponding to a first location of the image plane. Here, the actuator 202 and guidance system 200 are in a default position (e.g., the first flexure element 204 and the second flexure element 206 are not undergoing any flex or bend). The actuator 202 includes a first end 502 and a second end 504 and, in operation, the actuator 202 causes the distance between the first end 502 and the second end 504 to change, thereby, moving the image plane to different locations.

As shown in FIGS. 5A and 5B, the second end 504 of actuator 202 is a component made of molded plastic that attaches to the electronic display 102, the first flexure element 204, and the second flexure element 206. Moreover, as shown in FIGS. 5A and 5B, the third flexure beam 206*a* and the fourth flexure beam 206*b* of the second flexure element 206 are fixed to the molded plastic component at the second end 504 of actuator 202 and another end of the third flexure beam 206*a* and the fourth flexure beam 206*b* are fixed to bracket 506 that is fixed relative to optics block 104 (and which, in an embodiment, is integrated in a molded plastic housing or pod of optics block 104).

Accordingly, when the distance between the first end 502 and the second end 504 of the actuator 202 is increased to move the image plane to a new location, the first flexure element 204 and the second flexure element 206 bend as the electronic display 102 is moved away from optics block 104, as shown in FIG. 5B. Thus, the parallel beam flexure guidance system 200 produces linear motion along the optical axis 208 while minimizing parasitic error motions that includes straightness of travel of electronic display 102 relative to the optical axis 208 and angular error. Moreover, the parallel beam flexure guidance system 200 produces this motion within a form factor while minimizing power requirements.

Figure 6:
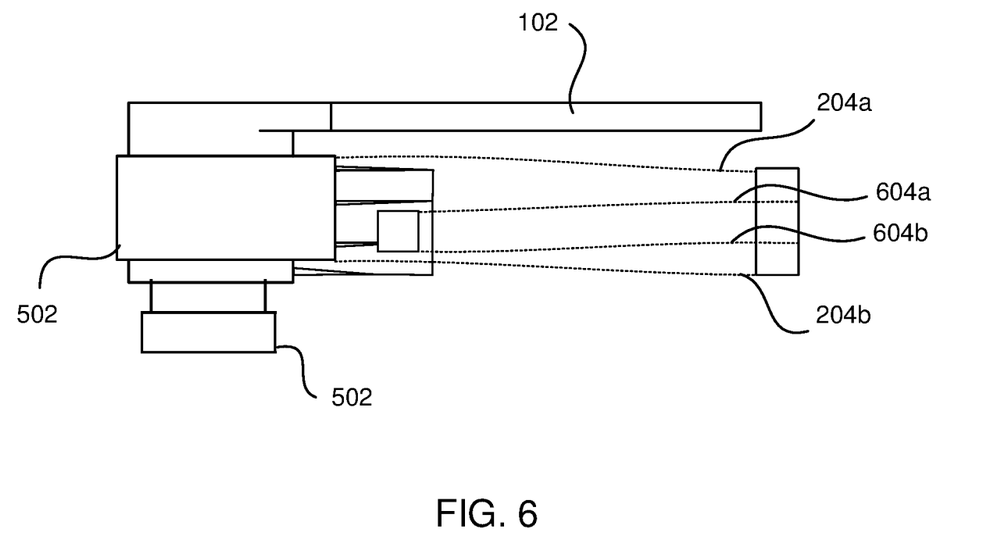
FIG. 6 shows a diagram of a compound parallel beam flexure guidance system, in accordance with at least one embodiment.

FIG. 6 shows a diagram of a compound parallel beam flexure guidance system, in accordance with another embodiment. In this embodiment, the parallel beam flexure guidance system 200 includes an additional second set of nested parallel beams (604a and 604b) between the first flexure beam 204a and the second flexure beam 204b. In this example, the additional second set of nested parallel beams (604a and 604b) operate to counteract off-axis translation that results from a projected beam length foreshortening (of the first flexure beam 204a and the second flexure beam 204b) that occurs during displacement. For example, if electronic display 102 translates in x and y (e.g., on the order of 30 to 60 microns) in the single parallel beam example described above as beams 204a and 204b bend while maintaining acceptable parallelism with respect to optics block 104 (0.020 degrees of tip/tilt at extent of travel), a compound parallel beam flexure guidance system, as shown in FIG. 6, can reduce the tip/tilt to close to zero. While FIG. 6 only shows a single compound parallel beam, it should be understood that a compound parallel beam guidance system would include a first compound parallel beam to aid in prevent tip/tilt in a first dimension and a second compound parallel beam to aid in prevent tip/tilt in a second dimension consistent with the embodiments discussed with respect to FIGS. 2-5.

Roberts Flexure Guidance

Figure 7:
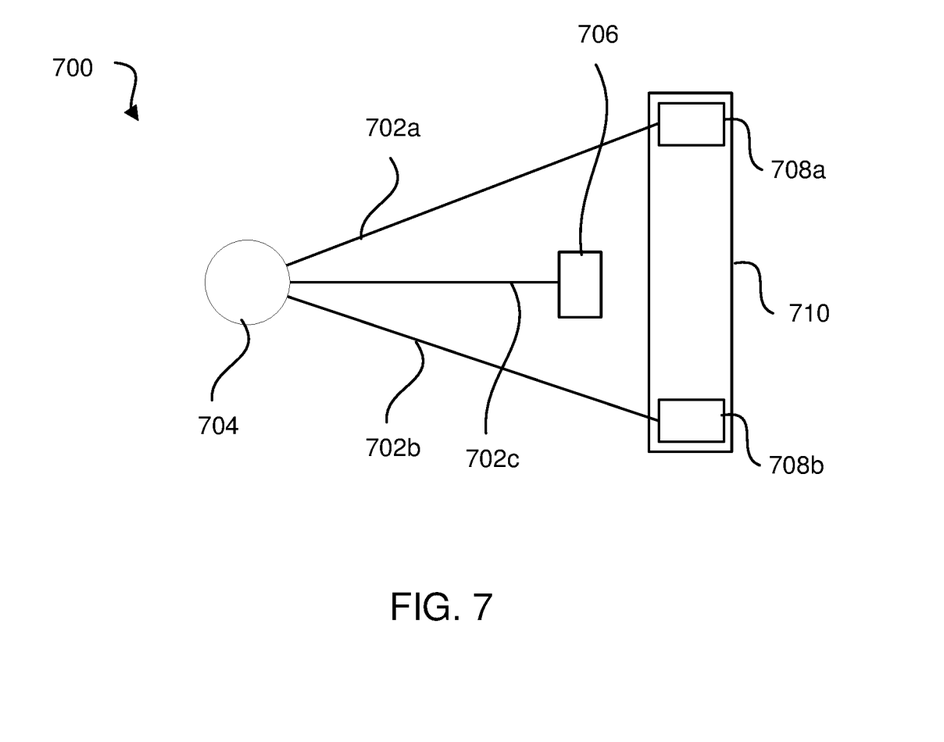
FIG. 7 shows a diagram of a Roberts flexure guidance system for use within a head mounted display, in accordance with at least one embodiment.

FIG. 7 shows a diagram of a Roberts flexure guidance system 700 for use within HMD 101, in accordance with at least one embodiment. A Roberts Mechanism is a linkage system that converts rotational motion to approximate straight-line motion and flexures can be incorporated into such a mechanism and used as a guidance system that guides the motion of electronic display 102 along the optical axis of optics block 104 to minimize tip/tilt. Roberts flexure guidance system 700 include three flexure elements (702a, 702b, 702c), a pivot point 704 where each of the flexure elements are connected, a first anchor 706 fixed relative to the optics block 104 which connects to flexure element 702c, and a pair of second anchors (708a and 708b) that each connect to one of flexure 702a and flexure 702b and that are fixed relative to electronic display 102 and the moving end of actuator 202 via platform 710. For clarification, platform 710 is fixed to the moving end of actuator and the pair of second anchors (708a and 708b) are fixed to platform 710. Platform 710, in some embodiments, is optional, however, given the geometry of a particular system, may become necessary, as will be discussed further below. Thus, in operation, the Roberts flexure guidance system 700 provides substantially linear and repeatable motion between first anchor 706 and the pair of second anchors (708a and 708b). This movement is discussed in more detail below with respect to FIGS. 8A and 8B.

Figure 8A:
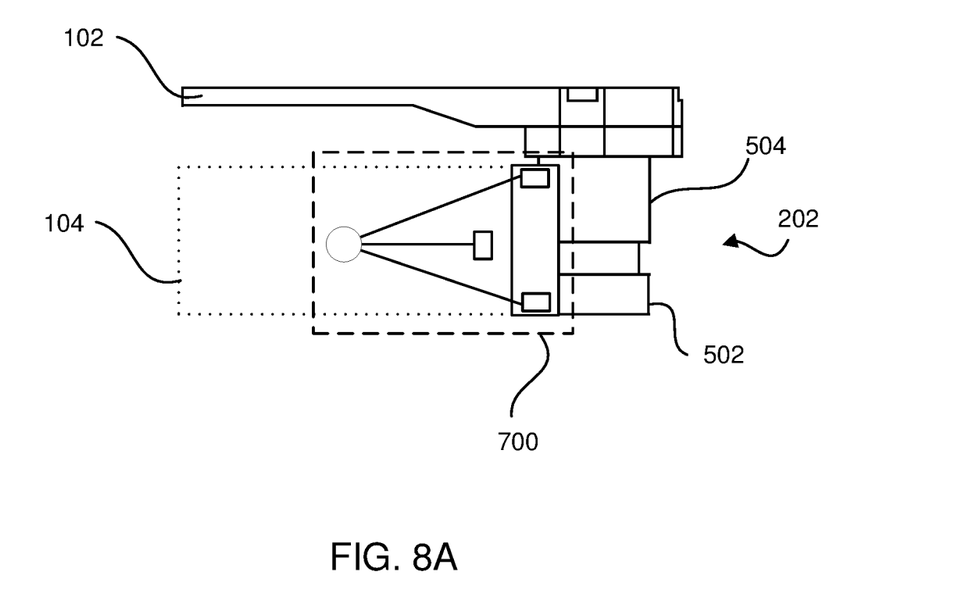
FIGS. 8A-8B show a Roberts flexure guidance system of a head mounted display in operation, in accordance with various embodiments.
Figure 8B:
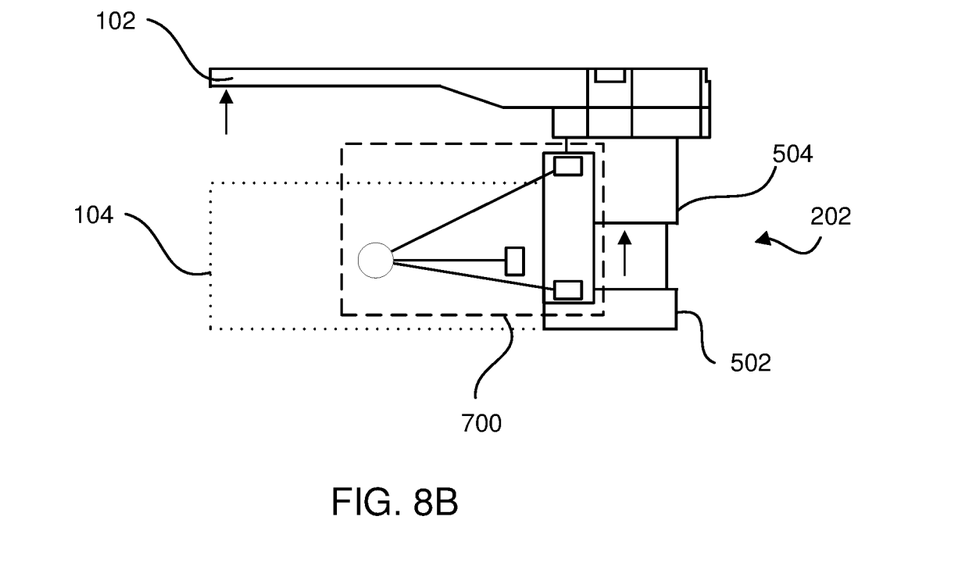

FIGS. 8A and 8B show a side view of the Roberts flexure guidance system 700 of a HMD in operation, in accordance with various embodiments. FIG. 5A shows the Roberts flexure guidance system 700 in a first state corresponding to a first location of the image plane. First anchor 706 is fixed, in this embodiment, to optics block 104. While FIGS. 8A and 8B show platform 710 and second anchor 708b as if these components are attached to the first end 502, the platform 710 is fixed to the moving or second end 504 of actuator 202 and a portion of the platform 710 that includes second anchor 708b is merely hanging above and over the first end 502 of actuator 202 in this embodiment. This becomes more apparent in FIG. 8B where the second end 504 of actuator 202 has moved along with platform 710 while the first end 502 remains fixed. As shown in FIG. 8A, the actuator 202 and guidance system 200 are in a default position (e.g., the three flexure elements (702a, 702b, 702c) are not undergoing any flex or bend).

As similarly discussed above, the second end 504 of actuator 202 is a component made of molded plastic that attaches to the electronic display 102 and platform 710 of the Roberts flexure guidance system 700. Accordingly, when the distance between the first end 502 and the second end 504 of the actuator 202 is increased to move the image plane to a new location, one or more of the flexure elements (702a, 702b, 702c) bend as the electronic display 102 is moved away from optics block 104, as shown in FIG. 8B. As shown, the three flexure elements (702a, 702b, 702c) have been flexed about pivot point 704 causing flexure element 702b to move closer to flexure element 702c while moving the platform 710 in the z-direction relative to first anchor 706. Thus, the Roberts flexure guidance system 700 produces linear motion along the optical axis in a predictable and repeatable manner.

While FIGS. 7-8B only shows a single Roberts flexure, it should be understood that the Roberts flexure guidance system 700 includes a first Roberts flexure to aid in prevent tip/tilt in a first dimension and a second Roberts flexure to aid in prevent tip/tilt in a second dimension consistent with the embodiments discussed with respect to FIGS. 2-5. Moreover, as discussed with respect to FIG. 6, the Roberts flexure guidance system 700 may additionally include a compound Roberts flexure guidance system that include four total Roberts flexures (two for the first dimension and two for the second dimension).

Additional Flexure Guidance Considerations

In accordance with various embodiments, the flexure elements may be single, compound, or some combination thereof. An example combination may include a straight line linkage based guidance system with a flexure based pivoting element, such as a Sarrus linkage, Scissor linkage, straight-line linkage, parallel four bar, and so on. In one embodiment, the first flexure element and the second flexure element are pivots of a Sarrus, Scissor, or straight-line linkage. The flexure elements can be made from a metal (e.g., Titanium, stainless steel, spring steel, Beryllium Copper) and/or plastic (e.g., DELRIN, Polypropylene, etc.). In some embodiments, the guidance system is designed to have what is referred to as "infinite life," or the property whereby the flexures of the guidance system operate below a strain or fatigue threshold of the material, above which the performance of the material of flexure begins to degrade over time with use.

The guidance systems have a small form factor in order to facilitate use with a HMD and/or a near-eye display. For example, as shown and described further below, the flexure elements may be curved or arched to further decrease the form factor of the guidance system and, as a result, the HMD. And in some embodiments, the flexure elements may be plastic that is formed (e.g., injected molded) to further decrease form factor. One improvement in form factor is a decrease in a width of the flexures. Decreasing the width of the flexures can proportionally decrease on-axis stiffness further but can result in a significant decrease in off-axis stiffness (proportional to b3). To counter this loss of off-axis stiffness, an additional flexure pairs can be added (e.g., from 4 to 6 flexures) to form a beam array. The result is a more compact flexure guidance system with truer motion and minimal power requirements.

Flexure based guidance systems introduce very low amounts of tip/tilt (e.g., may be as low as 0.001 degree) during on-axis movement relative to conventional systems. Moreover, the guidance systems offer a high fidelity of control over movement of the one or more moveable elements. This is important for optical systems, such as the pancake lens assembly, where a small amount of movement of a single optical element can correspond to a relatively large change in the image plane location. Accordingly, such guidance systems also offer a friction free system that provides smooth, continuous motion, with predictable (e.g., deterministic, repeatability, etc.) motion behavior, that if not designed to fully cancel out off-axis translation, can still be calibrated out due to the repeatable and deterministic nature of the motion. For example, some of the guidance systems introduce some off-axis translational displacement (e.g., in x and/or y) in the moveable element (e.g., the display) as it displaces the moveable element on-axis (e.g., along z-axis). One advantage of the guidance systems is that the translational off-axis displacement is deterministic (i.e., it occurs in a repeatable, consistent manner such that it can be calibrated out of the system). In some embodiments, the electronic display 102 is calibrated to emit light in manner that offsets error introduced by the off-axis translational displacement of the moveable element. Moreover, the compound configurations may also be used to mitigate translational movement using additional sets of flexure elements.

Additionally, since some actuators do not have passive position holding (i.e., no power), the flexure based guidance system may include a power-down, position hold or lock given that the flexure systems are spring biased toward a rested position where the flexures are in an unbent state. For example, the flexure based guidance system may include a mechanism, such as a disengaging pin, swing over paddle, or other motion blocking mechanism, that effectively locks the electronic display 102 in place when the HMD 101 is powered down and that unlocks the electronic display 102 when the HMD 101 is powered up. The motion blocking mechanism may be actuated using a small stepper and leadscrew, bi-stable solenoid, nitinol wire, and so forth.

Moreover, a flexure based guidance system can be designed to mitigate additional loading conditions that can result from orientation changes with respect to gravity and from user head whips, for example. In some embodiments, the guidance systems may additionally include dampeners to mitigate overshoot caused by rapid and/or sudden adjustments in the moveable element.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
   an electronic display;
   an optics block;
   a varifocal actuation system comprising:
      an actuator positioned off-axis relative to an optical axis of the optics block configured to adjust a location of an image plane of the headset by varying a distance between the electronic display and the optics block, the actuator having a movable end fixed relative to the electronic display and a fixed end fixed relative to the optics block; and
   a guidance system comprising:
      a first flexure element guiding movement of the electronic display along the optical axis in a first dimension, the first flexure element comprising a first pair of flexure beams parallel to each other; and
      a second flexure element guiding movement of the electronic display along the optical axis in a second dimension, the second flexure element comprising a second pair of flexure beams parallel to each other, a first end of each of the first flexure element and the second flexure element being fixed to the movable end of the actuator and a second end being fixed relative to the optics block, the first pair of flexure beams and the second pair of flexure beams arched in shape to conform to a shape around the optics block within the headset.

2. The headset of claim 1, wherein the first flexure element and the second flexure element are compound parallel beam flexures that each include an additional pair of flexure beams, the additional pair of flexure beams in the first flexure element parallel to the first pair of flexure beams and the additional pair of flexure beams in the second flexure element parallel to the the second pair of flexure beams.

3. The headset of claim 1, wherein the first flexure element is configured to minimize tilt of the electronic display in the first dimension and the second flexure element guide is configured to minimize tilt in the second dimension.

4. The headset of claim 1, wherein the varifocal actuation system varies a distance between the electronic display and the optics block along a z-axis, the first dimension corresponds to an x-axis, and the second dimension corresponds to an y-axis, wherein the first flexure element guides movement of the electronic display along the z-axis while minimizing tilt about the x-axis and the second flexure element guides movement of the electronic display along the z-axis while minimizing tilt about the y-axis.

5. The headset of claim 1, wherein the actuator is a voice coil actuator, stepper motor, or a brushless DC electric motor.

6. The headset of claim 1, wherein the headset is a head mounted display (HMD) or a near eye display (NED).

7. The headset of claim 1, further comprising:
an encoder in communication with the varifocal actuation system configured to:
   receive an input corresponding to a focal length for a frame of a virtual scene being presented on the electronic display;
   determine a position for the electronic display relative to the optics block to achieve the focal length; and
   provide the actuator with an instruction causing the electronic display to move relative to the optics block to achieve the focal length for the frame of the virtual scene.

8. A varifocal actuation system of a headset comprising:
an actuator configured to adjust an image plane at an exit pupil of the headset by varying a distance between an electronic display and an optics block of the headset, the actuator having a movable end fixed relative to the electronic display and a fixed end fixed relative to the optics block; and
a guidance system comprising:
   a first flexure element guiding movement of the electronic display in a first dimension, the first flexure element comprising a first pair of flexure beams parallel to each other; and
   a second flexure element guiding movement of the electronic display in a second dimension, the second flexure element comprising a second pair of flexure beams parallel to each other, a first end of each of the first flexure element and the second flexure element being fixed to the movable end of the actuator and a second end being fixed relative to the optics block, the first pair of flexure beams and the second pair of flexure beams arched in shape to conform to a shape around the optics block within the headset.

9. The varifocal actuation system of claim 8, wherein the actuator is positioned off-axis relative to an optical axis of the optics block.

10. The varifocal actuation system of claim 8, wherein the first flexure element and the second flexure element are compound parallel beam flexures that each include an additional pair of flexure beams, the additional pair of flexure beams in the first flexure element parallel to the first pair of flexure beams and the additional pair of flexure beams in the second flexure element parallel to the second pair of flexure beams.

11. The varifocal actuation system of claim 8, wherein the first flexure element is configured to minimize tilt of the electronic display in the first dimension and the second flexure element guide is configured to minimize tilt in the second dimension.

12. The varifocal actuation system of claim 8, wherein the actuator is a voice coil actuator, stepper motor, or a brushless DC electric motor, and wherein the varifocal actuation system is part of a head mounted display (HMD) or a near eye display (NED).

13. The varifocal actuation system of claim 8, wherein the varifocal actuation system varies the distance between the electronic display and the optics block along a z-axis, the first dimension corresponds to an x-axis, and the second dimension corresponds to an y-axis, wherein the first flexure element guides movement of the electronic display along the z-axis while minimizing tilt about the x-axis and the second flexure element guides movement of the electronic display along the z-axis while minimizing tilt about the y-axis.

\* \* \* \* \*

UNITED STATES PATENT AND TRADEMARK OFFICE
CERTIFICATE OF CORRECTION

PATENT NO. : 10,915,162 B2
APPLICATION NO. : 16/149303
DATED : February 9, 2021
INVENTOR(S) : Ryan Michael Ebert et al.

Page 1 of 1

It is certified that error appears in the above-identified patent and that said Letters Patent is hereby corrected as shown below:

In the Claims

In Column 15, Claim 2, Line 5, delete "to the the" and insert -- to the --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*